United States Patent [19]

Searle

[11] 4,081,014
[45] Mar. 28, 1978

[54] PNEUMATIC TIRE AND WHEEL RIM ASSEMBLIES

[75] Inventor: Eric Henry Searle, Sutten Coldfield, England

[73] Assignee: Dunlop Limited, England

[21] Appl. No.: 708,174

[22] Filed: Jul. 23, 1976

[30] Foreign Application Priority Data

Aug. 2, 1975 United Kingdom .............. 32390/75

[51] Int. Cl.² ...................... B60C 17/00; B60C 17/04
[52] U.S. Cl. ......................... 152/330 L; 152/330 RF; 152/158
[58] Field of Search ............ 152/330 L, 330 RF, 158; 252/26

[56] References Cited

U.S. PATENT DOCUMENTS

| | | | |
|---|---|---|---|
| 2,040,645 | 5/1936 | Dickinson | 152/330 L |
| 3,930,528 | 1/1976 | Harrington | 152/330 L |
| 3,990,491 | 11/1976 | Hampshire et al. | 152/330 L |

FOREIGN PATENT DOCUMENTS

| | | | |
|---|---|---|---|
| 1,359,467 | 7/1974 | United Kingdom | 152/330 L |
| 1,359,468 | 7/1974 | United Kingdom | 152/330 L |

*Primary Examiner*—Drayton E. Hoffman
*Attorney, Agent, or Firm*—Stevens, Davis, Miller & Mosher

[57] ABSTRACT

A pneumatic tire and wheel rim assembly capable of being driven with the tire deflated comprising at least one circumferential band of magnetized rubber or plastics material on an interior surface of the assembly which contacts and is required to move relative to a further such surface when the tire is deflated and a magnetized liquid lubricant maintained in position by the band to facilitate relative movement between the contacting surfaces within the assembly when the assembly is driven with the tire deflated.

11 Claims, 4 Drawing Figures

PNEUMATIC TIRE AND WHEEL RIM ASSEMBLIES

This invention relates to pneumatic tire and wheel rim assemblies and, in particular, to such assemblies which are capable of being driven with the tire deflated.

In U.K. Patent Specification No. 1,359,467 there is described a pneumatic tire and wheel rim assembly which is capable of use in a deflated condition and provided with a flowable liquid lubricant for facilitating relative movement between the interior surfaces of the tire which come into contact during deflated running. The advantage of such a lubricant is that it is very effective since it will flow onto those regions of the tire surface where it is needed and thus does not allow parts of the contacting surfaces to become devoid of lubricant. On the other hand, it is not desirable to leave the liquid permanently loose in the assembly so that either the lubricant is enclosed by suitable means in the assembly and only released when it is needed or a warning of tire deflation is required so that the vehicle may be stopped and the lubricant injected into the tire.

There has been also proposed using a coating of lubricant on the inside of a tire as described in U.K. Patent Specification No. 1,359,468. In this instance there is the possible disadvantage that if displaced from a part of the tire surface the lubricant will not return to those regions of the tire surface where it is needed.

According to the present invention, a pneumatic tire and wheel rim assembly capable of being driven with the tire deflated comprises at least one circumferential band of magnetized rubber or plastics material on an interior surface of the assembly which contacts and is required to move relative to a further such surface when the tire is deflated, and a magnetized liquid lubricant maintained in position by the band to facilitate relative movement between the contacting surfaces within the assembly when the assembly is driven with the tire deflated.

Preferably a circumferential band is disposed on the interior surface of the tire sidewall and/or the interior surface of the tire tread.

The tire and wheel rim assembly may contain no internal support such as those described in the two U.K. Patent Specifications referred to above. In this case the contacting surfaces are interior surfaces of the tire itself. Alternatively the assembly may contain an internal annular support upon which the load carried by the assembly will bear when the tire is deflated. When such a support is used a circumferential band is preferably disposed on the radially outermost surface of the support which contacts the interior surface of the tire when the assembly is driven deflated. The annular support may be capable of rotation about the wheel rim in which case a circumferential band may be disposed on the radially innermost surface of the support.

The band of magnetized material may suitably comprise a rubber compound into which a magnetic material such as barium ferrites has been incorporated, the use of rubber being preferred, particularly if the band of magnetic material is incorporated in, or attached to the tire. Barium ferrites is the preferred magnetic material although other materials such as lead and zinc ferrites are also possible.

A magnetic band or bands of rubber may be built into the tire either in the uncured form or be positioned subsequently in the tire.

The positioning of the magnetic band or bands of rubber in the assembly is such as to retain lubricant in those areas of the assembly in which it will be required if the tire deflates, thus preventing lubricant from moving about inside the assembly and also enabling less lubricant to be used.

The magnetized liquid lubricant preferably comprises a ferrofluid which includes small particles of a soft magnetic material colloidally suspended in a carrier fluid which is a lubricant.

The small particles may, for example, have a particle size of the order of 100 A, and may suitably consist of $Fe_3O_4$.

The invention is illustrated diagrammatically in the accompanying drawings in which.

Figure 1:
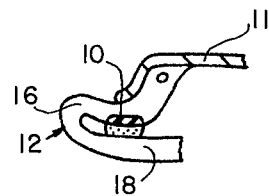
FIG. 1 is a section view of a portion of a tire and wheel rim assembly with the tire deflated and a magnetic rubber material in the internal surface of the lower sidewall.

FIG. 1 shows a band 10 of magnetic rubber material included in the internal surface of the lower sidewall of a tire 12. A lubricant ferrofluid 14 is retained in position on this band, in order to eliminate friction if the tire becomes deflated when the lower sidewall 16 of the tyre will come into contact with a further portion 18 of the tire interior surface as illustrated.

Figure 2:
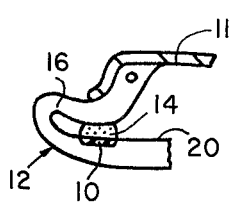
FIG. 2 is a sectional view similar to FIG. 1 with the magnetic material on the inner surface of the tire immediately under the tread edge.

FIG. 2 shows an assembly similar to that in FIG. 1 except that the band 10 of rubbery magnetic material is incorporated on the inner surface 20 of the tire immediately under the tread edge.

FIGS. 1 and 2 show a band 10 of rubbery magnetic material moulded in position but the latter could be added to the interior surface of the tire after moulding in which case the arrangement shown in FIG. 2 would be preferable since the joint between band and tire in that case would be subject to less fatigue and would be assisted by centrifugal force.

Figure 3:
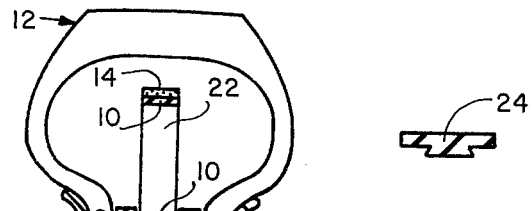
FIG. 3 is a sectional view of a portion of a tire and wheel rim assembly containing an internal support.

FIG. 3 shows the invention applied to a tire 12 and wheel 11 assembly containing an internal support 22 which is capable of rotation about the wheel rim 11. The ferrofluid lubricant 14 is retained in contact with the inner and outer surfaces of the support using bands of magnetic material 10 as shown. The latter may, for example, be strips of plastics or rubber material into which a magnetic material has been incorporated.

Figure 4:
FIG. 4 is a sectional view of a strip of magnetic elastomer material for attachment to an internal support.

FIG. 4 illustrates the cross-section of a strip 24 of magnetic rubber or plastics material for attachment to an internal support which would be provided with a suitable groove for its location.

In all cases the bands of magnetic material may be polarized through their thickness or across their width as required. In the case of tires having steel cored carcasses or breakers polarization through the thickness would be preferable, although polarization across the width would be easier to achieve if magnetization of the band in situ were to be desired.

Having now described my inventions, what I claim is:
1. A pneumatic tire and wheel rim assembly capable of being driven with the tire deflated comprising
   at least one circumferentially extending band of rubber or plastics material containing magnetized par- ticles, said band being on an interior surface of the assembly which contacts and is required to move relative to a further such surface when the tire is deflated and a liquid lubricant containing magnetized particles and maintained in position by the band to facilitate relative movement between the contacting surfaces within the assembly when the assembly is driven with the tire deflated.

2. A pneumatic tire and wheel rim assembly as claimed in claim 1 in which a circumferential band is disposed on the interior surface of the tire sidewall.

3. A pneumatic tire and wheel rim assembly as claimed in claim 1 in which a circumferential band is disposed on the interior surface of the tire tread.

4. A pneumatic tire and wheel rim assembly as claimed in claim 1 including an internal annular support upon which the load carried by the assembly will bear when the tire is deflated.

5. A pneumatic tire and wheel rim assembly as claimed in claim 4 in which a magnetized circumferential band is disposed on the radially outermost surface of the annular support.

6. A pneumatic tire and wheel rim assembly as claimed in claim 4 in which the annular support is capable of rotation about the wheel rim and a magnetized circumferential band is disposed on the radially innermost surface of the support.

7. A pneumatic tire and wheel rim assembly as claimed in claim 1 in which the circumferential band comprises barium, lead or zinc ferrites.

8. A pneumatic tire and wheel rim assembly as claimed in claim 1 in which liquid lubricant is a ferrofluid.

9. A pneumatic tire capable of being driven in a deflated condition comprising at least one circumferentially extending band of rubber or plastics material containing magnetized particles, said band being on an interior surface of the tire which contacts and is required to move relative to a further such surface when the tire is deflated and a liquid lubricant containing magnetized particles and maintained in position by the band to facilitate relative movement between the contacting surfaces within the tire when it is driven in a deflated condition.

10. The pneumatic tire of claim 9 in which a circumferentially extending band is disposed on the interior surface of the tire sidewall.

11. The pneumatic tire of claim 9 in which a circumferentially extending band is disposed on the interior surface of the tire tread.

* * * * *